United States Patent [19]

Mehnert et al.

[11] Patent Number: 5,587,196
[45] Date of Patent: Dec. 24, 1996

[54] METHODS AND COMPOSITIONS TO ADD FLAVOR TO FOOD PRODUCTS CONTAINING LIPID

[75] Inventors: David W. Mehnert, Antioch; Kevin Forneck, Morton Grove; Steven Prince; Michael D. Major, both of Evanston, all of Ill.

[73] Assignee: Kraft Foods, Inc., Northfield, Ill.

[21] Appl. No.: 388,013

[22] Filed: Feb. 15, 1995

[51] Int. Cl.$^6$ .................................................. A23D 9/007
[52] U.S. Cl. .......................................... 426/611; 426/804
[58] Field of Search .................................... 426/611, 804

[56] References Cited

U.S. PATENT DOCUMENTS

| | | |
|---|---|---|
| 3,164,477 | 1/1965 | Nobile et al. . |
| 3,600,186 | 8/1971 | Mattson et al. . |
| 4,005,195 | 1/1977 | Jandacek . |
| 4,005,196 | 1/1977 | Jandacek . |
| 4,199,608 | 4/1980 | Gilmore et al. . |
| 4,571,342 | 2/1986 | DiCicca et al. . |
| 4,820,538 | 4/1989 | Schulman et al. . |
| 4,830,787 | 5/1989 | Klemann et al. . |
| 4,865,868 | 9/1989 | Kuss . |
| 4,880,657 | 11/1989 | Guffey ........................................ 426/611 |
| 4,919,964 | 4/1990 | Adams ........................................ 426/611 |
| 4,940,601 | 7/1990 | Orphanoa ................................... 426/611 |
| 4,952,687 | 8/1990 | Bodor ......................................... 426/611 |
| 4,992,293 | 2/1991 | Klemann et al. . |
| 5,017,398 | 5/1991 | Jandacek .................................... 426/611 |
| 5,021,256 | 6/1991 | Guffey ........................................ 426/611 |
| 5,064,677 | 11/1991 | Cain .......................................... 426/611 |
| 5,071,669 | 12/1991 | Seiden ....................................... 426/611 |
| 5,073,398 | 12/1991 | Kuss . |
| 5,158,796 | 10/1992 | Bernhardt et al. . |
| 5,248,509 | 9/1993 | Briun ......................................... 426/611 |
| 5,294,451 | 3/1994 | Meyer ....................................... 426/611 |

OTHER PUBLICATIONS

Bennett, H. (1968) *Practical Emulsions*, vol. II, Chapter 8 "Food Emulsion" Chemical Publishing Company, NY.
"The Microbiology of Cheese," pp. 191–198, Chap. 5 The Microbiology of Fermented Milks p. 265, Chap. 6 (1981) in Robinson, R. *The Microbiology of Milk Products* vol. 2, in *Dairy Microbiology*, Applied Science Publishers, N.J.

*Primary Examiner*—Carolyn Paden
*Attorney, Agent, or Firm*—Arnold, White & Durkee

[57] ABSTRACT

Methods and compositions are presented to add a flavor to a food by incorporating the flavor into a lipid phase of the food by means of a fat substitute carrier. Adding flavor to the fat substitute carrier, in particular via volatilization, produces excellent characteristics such as reduced mouthcoating and flavor equivalent to that of a comparable full fat food, with the least amount of added triglyceride. The invention is useful for adding flavor to both reduced fat and full fat foods.

39 Claims, 1 Drawing Sheet

METHODS AND COMPOSITIONS TO ADD FLAVOR TO FOOD PRODUCTS CONTAINING LIPID

BACKGROUND

Methods and compositions are presented to add a flavor to a food by incorporating the flavor into a lipid phase of the food by means of a fat substitute carrier. Adding flavor to the fat substitute carrier, in particular via volatilization, produces excellent characteristics with the least amount of added triglyceride. The invention is useful for adding flavor to both reduced fat and full fat foods.

Flavor is an elusive, complex, yet necessary component of foods. Flavors are volatile and non-volatile components which provide tastes, odors, and mouth sensations to edible food products. Flavors may be:

1. Natural to a particular food system in that they are generated in the routine process of manufacturing that food (such as a natural cheese flavor);
2. A result of an process different from that in 1, a process where the flavor may be preformed, isolated and then added to a food (such as a spice flavor);
3. Synthetic, formulated from simple base materials (such as inorganic salt flavors).

A category of food products for which flavor is particularly elusive, includes healthier food products characterized as "reduced fat," "low fat," or "fat free". Although these food products have been successfully manufactured, for many of these products flavor is unsatisfactory to consumers when compared to the flavor of the comparable product that contains fat at normal levels, that is, levels of "full fat" characteristic of a food. This is a particular problem for dairy products.

On the other hand, some of the most distinctive and popular flavors characterize cultured dairy products. Therefore, it is a challenge to produce reduced fat cultured dairy products that have a flavor equal to their full fat counterpart. Without flavor, these products are unacceptable to consumers, even though they may fulfill consumers' demand for healthier products.

Milk fat provides flavors preferred by consumers. Unfortunately, problems have arisen in attempts to preserve the milk fat flavors in dairy products designed to meet trends in consumers eating patterns based on health-conscious avoidance of high fat and/or high cholesterol foods. As pointed out in Chapman and Sharpe (1981), " . . . Cheddar cheese made from skim milk has no Cheddar flavor at all." The reason for this flavor loss is not clear.

Unfortunately, problems arise in making reduced fat food that is acceptable to consumers. One undesirable side effect of reducing fat, is that the flavor is not comparable to the flavor in the full fat counterpart of the food (designated herein as a "normal" flavor). If there is no direct, readily identifiable full fat food flavor counterpart, the flavor of the "new" reduced fat food is not found by consumers to be tasty.

For reduced fat products, a fat mimetic or substitute is added to the food. A preferred substitute is a polyol polyester.

U.S. Pat. No. 3,600,186, Mattson et al., relates sugar and sugar alcohol fatty acid polyesters as a low calorie replacement for normal triglyceride fat in food products.

Methods for preparing sugar and sugar alcohol fatty acid esters, and the composition of such esters are disclosed in U.S. Pat. Nos. 4,191,964, and 5,158,796, for example. An undesirable effect of liquid polyol fatty acid polyesters is to cause anal leakage. In an attempt to avoid this problem, U.S. Pat. No. 4,005,195 and U.S. Pat. No. 4,005,196 of Jandacek, disclose a method of adding anti-anal leakage agents to the liquid polyesters.

Other types of reduced caloric fat substitutes are available, as discussed in U.S. Pat. No. 4,191,964, col. 6; U.S. Pat. No. 3,164,477 (sucresters); U.S. Pat. No. 4,830,787 (homogenized cyclamate esters); U.S. Pat. No. 4,199,608 (an edible glycerol ester); and U.S. Pat. No. 4,992,293 (thioesters).

For example, flavor problems exist in foods prepared with a fat substitute that is a non-digestible fat, such as a polyol polyester, in particular, a sucrose polyester (SPE). For SPE-containing food, the perception of "normal" fatty flavors is reduced because they are not there, and there is a reduction in the overall perception of "normal" flavors, that is, flavors usually associated with the "full fat" food probably due to mouthcoating. Another problem making reduced fat products compare unfavorably to full fat foods is that polyol polyester fat substitutes suppress salt perception.

The causes for the reduction in flavor perception accompanying use of a fat substitute, are unknown. A possibility is that the flavor problems arise due to binding of the flavors more tightly by the fat substitute than binding of flavors by a normal fat triglyceride, thereby suppressing flavors. Another likely explanation for reduced flavor perception is that the flavor components are blockaded from reaching the surface of the mouth and tongue by the fat substitute which can coat the oral surfaces.

Another possible explanation for the flavor reduction associated with SPE is that the higher viscosity of SPE as compared to an analogous triglyceride fat, tends to reduce the rate at which flavors are able to diffuse through a matrix containing SPE. Therefore, the flavors are not distributed throughout SPE to be available for tasting.

Another common deficiency of reduced fat foods is the abnormal rate of flavor display upon consumption of the food. Often, the consumer perceives initially that the food has a sufficient level of flavor; however, the flavor tends to dissipate quickly after consumption of the food. A possible reason for this problem is that there is no flavor compartment to deliver the flavor to the consumer continuously over the time during which the food is consumed.

Recognizing the importance of flavor to the consumer, attempts have been made to improve the flavor of reduced fat, low fat, or fat free products, but there still remains a need for a simple, reproducible, relatively inexpensive method to create flavors that are acceptable to consumers, without defeating the purpose of manufacturing a healthy product.

Attempts to improve flavor in reduced fat foods have not been successful. One of the conventional methods of adding a flavor to a reduced fat food is to add the flavor to a water phase. This method does not produce optimum flavor in the food, possibly due to failure of the flavor to be absorbed through the mouth tissues. The mouth is likely to be coated by the fat substitute, so the flavor-containing water just washes through the mouth without encountering the taste buds. A possible solution to this problem is to load large amounts of flavor in the water phase to try to overcome the coating effect. However, this method is not able to overcome problems in flavor perception. Reduction in the overall perception of flavor level still characterizes reduced fat food prepared in this manner.

Another possible solution is to mix fat soluble flavors with fat and add the mixture to foods, but the amount of fat could then exceed FDA regulations for label descriptors such as "Light" or "Free," prohibiting marketing of the food under those designations. Fat based flavors that could be added to fat include oleo resin garlic.

The methods and compositions of the present invention address the need to produce lipid-containing foods that maintain a natural flavor, while reducing overall fat content. To accomplish this, flavors are incorporated into the fat substitute which acts as a carrier. These methods and compositions of the present invention are not limited to reduced fat foods, but may also enhance flavor in full fat foods.

SUMMARY

The invention relates methods and compositions for adding a flavor to a food that has a lipid phase, by means of a combination of a flavor and a fat substitute that has a lipid phase. A flavor carrier is produced by incorporating flavor into a fat substitute. Combining flavor with the fat substitute, in particular via volatile transfer, not only provides excellent flavor, but reduces the undesirable mouthcoating which characterizes reduced fat foods. A concentrate of flavor in a suitable fat substitute is effective even in relatively small amounts.

The methods and compositions of the invention are used to enhance or change flavors of a food, in particular a food containing a fat substitute. However, the invention is also useful to improve or change flavor in a full fat food, without increasing fat content. Reduced fat foods differ from full fat foods in having a smaller lipid phase relative to the volume of the finished food. Reduced-fat foods containing a fat substitute have flavors that compare unfavorably to the foods that do not have a fat substitute. In addition, fat substitutes can confer undesirable mouthcoating in foods containing them. This is a particular disadvantage in foods containing a wholly or partially non-digestible fat as a fat substitute. The invention takes a disadvantage of fat substitutes, flavor binding, and surprisingly converts it to an advantage, that is, to carry flavor as opposed to suppressing flavor.

The present invention improves flavor in a reduced-fat food by adding flavor either directly to the fat substitute by mixing a flavor into the fat substitute, or indirectly by contacting a fat substitute with the desired flavor, for example, by volatilization and then adding the resulting combination to a food. Examples of substances for volatile transfer include butterfat, grill flavor or oxidized soy oil. Flavored fat substitute concentrate is also used as a color and/or vitamin carrier. Beta-carotene may be mixed with the fat substitute to produce fat-free Cheddar, for example. If the lipid phase of a food is not a reduced fat phase, the flavor is combined with a fat substitute and added to the full fat food. Alternatively, foods may be fried in a flavored fat substitute.

If all of a fat substitute used in a food is flavored, the flavor may be relatively dilute. On the other hand, if the flavored fat substitute will be diluted in a target food, the flavor may be concentrated in the fat substitute.

Unexpectedly, volatile transfer of flavor to a fat substitute reduces the undesirable mouthcoating which generally characterizes certain fat substitutes. It was not expected that taking the cause of flavor loss, a fat substitute, and using it to enhance flavor, would solve the flavor problem in reduced fat foods and improve mouthfeel.

The lipid phase which carries the flavor is a fat substitute, in particular a non-digestible fat. The non-digestible fat can be a polyol polyester (PFAP), preferably a sucrose polyester (SPE). Fat substitutes which are suitable for use in the present invention include any lipophilic polyol fatty-acid polyester, jojoba oil, polysiloxanes, acylated glycerides, polyalkoxyglycerolethers, and dicarboxylic acid esters. Additionally other oils with reduced calorie content, such as medium chain triglyceride and structured lipids can benefit from volatile flavor transfer.

By providing a lipid phase carrier that is a fat substitute to deliver flavor, the duration of flavor delivery is prolonged, thereby resulting in the perception of increased flavor strength. In addition to acting as a medium for carrying flavor, the fat substitute lipid phase provides a means of delivering flavor to the mouth surfaces. A possible disadvantage of some fat substitutes such as SPE, is that they suppress flavor by coating the surface of the mouth thereby preventing transport of flavor to the oral surfaces. In the present invention, this disadvantage is turned into an advantage because the fat substitute enhances flavor, most likely by holding the flavor in proximity to the mouth surfaces, thereby allowing the flavor to be transferred from the lipid phase to the mouth surfaces.

A non-digestible lipid phase is useful as a carrier for lipophilic flavors in reduced fat foods that contain digestible fats. However, the advantages of using a fat substitute lipid carrier to add flavor to a food are not limited to reduced fat foods. Full fat foods also benefit from turning the disadvantages of a fat substitute into advantages as a flavor carrier. New flavors or enhanced flavors are added by means of the methods and compositions of the present invention to full fat foods without increasing the fat content of the food. New flavors or enhanced flavors are added.

The flavor to be incorporated into the lipid carrier includes flavor precursors, flavor components, and fractions of flavor components. Flavors suitable for the practice of the invention include natural or synthetic fat flavors such as those that are characteristic of milkfat, butterfat, animal fat, and vegetable fat. Water soluble flavors are also suitable. The desired flavors to add to a particular food are food flavors that are desirable to mimic. If flavor is being added to a reduced fat food, the desired flavor is generally that characterizing the full fat version of the food. If the food to which a flavor is added is a full fat food, the desired flavor includes an exogenous flavor not generally present in the food, or the same flavor generally present in the food if the goal is flavor enhancement.

The food to which a flavor is added may be any food with a lipid phase. Foods suitable for the practice of the invention include dairy products and products which normally contain vegetable oil or animal fat. Food products containing vegetable oil include salad dressings and sauces such as Miracle Whip and Hollandaise. Dairy products include cultured dairy products such as cheese and yogurt. For a reduced fat cheese, suitable flavors include those characteristic of Cheddar, Swiss and Mozzarella.

Several examples serve to illustrate means to flavor the fat substitute. Under the category of direct addition of flavors, dairy flavors or cheese flavors are added to the lipid phase early in the process of preparing the product so that the flavor components have time to diffuse into the lipid phase where they can be perceived throughout the time of eating. In addition to providing the required flavor for the product, the additional time required for the diffusion of the added flavor through the lipid and onto the oral surfaces is expected to extend the duration during which the flavor is perceived. Therefore, the flavor strength is modulated through the action of the lipid material.

In an illustrative embodiment, the fat substitute is contacted with flavors or spice blends that are primarily water-soluble and that are typically added to a product (such as a salad dressing) in the aqueous phase. By controlling the conditions of such contact, such as time and temperature, the lipid phase absorbs components of the water soluble flavor or spices. Thus, when the product is eaten, the flavor is delivered to the oral surfaces from both the aqueous and the lipid phases thereby increasing the length of time for which the flavor is perceived.

In an illustrative embodiment, the lipid material is flavored by contacting the lipid with the volatile components of a product with the desired flavor. In many instances, the flavors, which are often volatile, are carried by the fatty portion of the product. When it is desired to produce a product that has little or no digestible fat present it is preferable to transfer the flavors from a digestible fat-containing product into the product which contains the wholly or partially non-digestible fat. This can be effected by contacting the non-digestible (target) lipid with the volatile compounds (flavors) from the source lipid. The source lipid includes a finished product of the target type. Any means of contact is suitable to the practice of this invention provided it allows compounds to be transferred to a non-digestible lipid. The volatile components are transferred by distillation means, such as vacuum distillation, or steam distillation, where the fat replacer serves as a vapor trap in the distillation process.

Volatilization has the unexpected benefit of reducing undesirable mouthfeel generally associated with some fat substitutes such as polyol polyesters. The most volatile components appear to transfer flavor sufficient to match the full fat component of food, while having the greatest effect on textural components.

In yet another embodiment, the target lipid is contacted with a solvent in which the desired flavors are concentrated, for example, the flavors are solvent stripped from a product having the desired flavors. Alternatively, the flavors are removed from their source by supercritical carbon dioxide extraction (or similar extraction process) and added subsequently to the target lipid materials.

In another embodiment, the flavor is transferred to the lipid phase, for example by contacting the lipid with a concentrated source of the desired flavor and allowing the flavor to be transported to the lipid phase by diffusion or by condensation into the lipid phase from a source from which it is evaporated or stripped by a solvent or vapor.

DESCRIPTION OF THE PREFERRED EMBODIMENT

Figure 1:
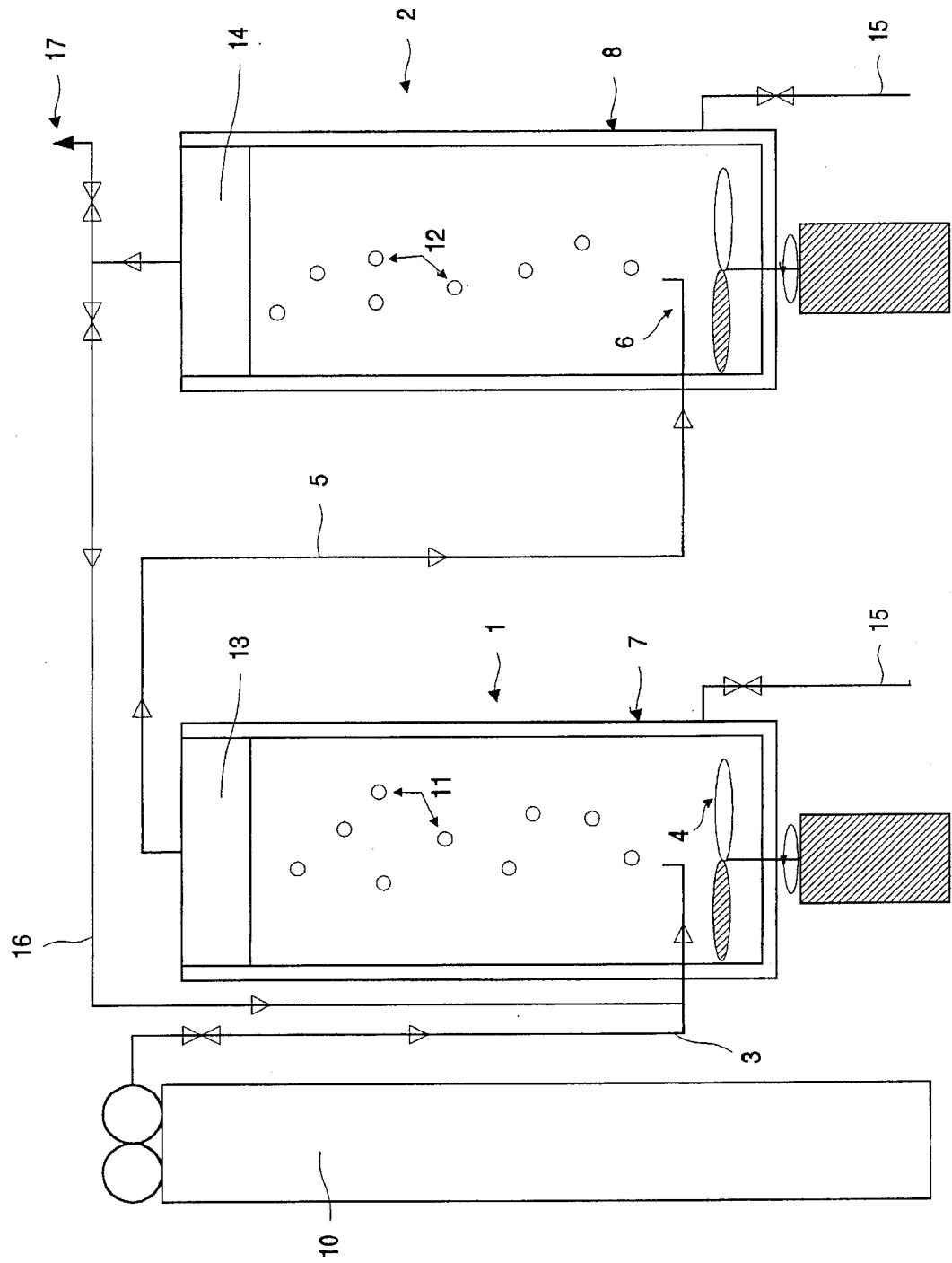
FIG. 1 is a diagrammatic representation of an apparatus suitable for volatilization of flavor into a fat substitute carrier.

Using the methods and compositions of the present invention, foods were prepared that were preferred in taste tests. In some examples the foods were full fat foods, in other examples, the foods were reduced fat foods.

Methods for volatile transfer of flavor to a fat substitute such as polyol fatty acid polyesters (PFAP) are described herein. These methods are based on U.S. Pat. Nos. 5,075,398 and 4,865,868 and present volatile transfer methods for flavor into an oil. As the following examples show, both rheological analysis of volatile flavored SPE and taste tests of products flavored by compositions of the present invention confirm that flavor was transferred to the fat substitute according to the present invention and was detectable in blind, controlled taste tests.

That very small amounts of flavored PFAP are capable of producing strong and preferred flavors, is illustrated by the tests of condiments flavored according to the present invention. These flavored condiments were sufficient to confer distinguishable and desirable flavors on hot dog and hamburger sandwiches.

Surprisingly, use of flavored SPE as a frying oil to fry potatoes resulted in preferred products, while avoiding high fat, animal fat and frying oil.

Examples include preparation of a flavored food emulsion, preparation of a salad dressing containing flavored PFAP, preparation of reduced fat natural cheese flavored with PFAP, and flavored condiments. In all blind taste tests, foods with flavored PFAP were preferred for their taster texture and mouthfeel.

EXAMPLE 1

Volatile Transfer of Flavor to Polyol Polyester

SPE (Olestra) is a PFAP which has been used for many food preparations. SPE is a non-digestible non-absorbable, fat-like material consisting primarily of hexa-, hepta- and octa-esters of sucrose and fatty acids. There must be at least 4 fatty acid ester groups present because those compounds with 3 or fewer groups are digestible. The fatty acids used may have between 8 and 22 carbon atoms but those with 14 to 18 carbons are preferred. Sugars other than sucrose may be used to make polyol fatty acid esters that are non-digestible. They include monosaccharides with at least 4 hydroxy groups, disaccharides and trisaccharides. Thus erythritol, xylitol, sorbitol, glucose and sucrose can be used for the polyol moiety. SPE is preferably synthesized by a solvent-free interesterification reaction or by direct esterification using acid chlorides or anhydrides. The physical properties of SPE depend primarily on the fatty acids used in its preparation. For example, SPE made from unsaturated fatty acids, such as those from safflower oil, or from short-chain fatty acids are free-flowing liquids at room temperature. On the other hand, those made from saturated or long-chain fatty acids, such as tallow, are usually solid at room temperature.

For the present example, measured portions of a form of sucrose polyester (SPE) designated SBO III (Table 1) and anhydrous butterfat were loaded into the respective laboratory vessels 1 and 2 as shown in FIG. 1. Nitrogen gas was continuously forced into the vessel containing butterfat. High speed constant agitation was maintained within vessel 1 to assist in dispersing the nitrogen gas throughout the butterfat. The gas in butterfat vessel 1 was vented via internal pressure into the vessel 2 containing the SPE and allowed to bubble through the melted material.

Twenty pounds of anhydrous butterfat were placed into vessel 1. Similarly, 20 pounds of the SPE were loaded into vessel 2. Vessels 1 and 2 have head spaces 13 and 14 respectively. A continuous and steady flow of pure nitrogen gas 10 (at approximately 5 psig) was introduced into the system via an inlet tube 3. This gas was bubbled through the anhydrous butterfat 11 in vessel 1 which was heated to and maintained at 250° F. by means of a steam jacket 7 as shown in FIG. 1. Additional gas dispersion within the butterfat was accomplished by high speed continuous paddle agitation provided by rotary stirring system 4. The gas escaping from the melted butterfat was then directed away from the vessel 2 through tube 5. The "butter flavored" nitrogen was bubbled through the SPE 12 contained therein by means of tube 6 projecting below the surface of the SPE and was maintained at (approximately 150° F.) via a steam jacket 8. A steam source 15 connects to vessels 1 and 2. Vapor recirculates through tube 16 to vent 17.

This treatment process was maintained under the aforementioned conditions for 120 minutes after which the SPE was tested for odor and flavor. Odor was "butter like" to a moderate degree as was also the flavor of the oil. The treated sample was placed in a covered container and stored for five days and again evaluated indicating a flavor and odor of equal intensity.

EXAMPLE 2

Effect of Volatile Transfer Flavor on SPE

Viscosity versus shear rate graphs of the flavored and control SPE materials were analyzed. The first three graphs showed that all three samples become less viscous as the temperature is increased. The second three indicate that addition of the grill flavor decreased the SPE viscosity below that of the other two materials. The graphs also showed that the butter flavored sample was very similar to the control, but slightly less viscous. The information suggests that addition of the flavor components via the heating/condensing method changes the SPE (or PFAP) rheology.

These samples were made into natural Cheddar cheese and evaluated by an expert panel of tasters. Results indicate that the butter and grill flavors did transfer into the cheese and also that the rheological changes from the grill flavor were distinguishable in the cheese.

EXAMPLE 3

Preparation of a Food Emulsion Containing a Flavor Carrier

Step 1:
Blend emulsifier (e.g. egg, sodium caseinate, polysorbate, mustard flour, and the like) with water and other aqueous phase ingredients to form a mixture. Examples of such mixtures for food emulsions may be found in Chapter XX, of Bennett (1947) (see also Chapters I and IX).
Step 2:
In a separate vessel, heat vegetable oil or PFAP (the lipid phase of the food emulsion) which contains flavors added to all or part of the lipid phase, according to the present invention to a temperature above its melting point so that it is able to flow freely. Alternatively, the desired flavors may be added to the oil after it has been heated.
Step 3:
Heat the aqueous mixture to a temperature above the melting point of the lipid phase to ensure that the lipid phase will not solidify upon contact with the aqueous portion of the food emulsion.
Step 4:
Add the lipid phase to the aqueous mixture slowly with constant mixing to form a coarse "oil-in-water" emulsion.
Step 5:
"Finish" the emulsification by higher energy mixing such as homogenization, high shear mixing, and the like.

Step 6:
In a separate vessel, prepare a hydrocolloid solution, such as a starch which thickens upon cooking, optionally including gums, salt, sugars, flavorings, and the like.
Step 7:
Blend the optional hydrocolloid solution with the finished emulsion if desired, to form the final finished product.

EXAMPLE 4

Preparation of a Salad Dressing Containing Flavored SPE

Step 1:
Blend emulsifier (e.g. egg) with water and other aqueous phase ingredients to form a mixture.
Step 2:
Heat the mixture to a temperature above the melting point of the SPE to be added (see Table for examples).
Step 3:
Add SPE which has been treated with a flavor in accordance with the present invention (Example 1 provides one method) to the mixture slowly with constant mixing. The result of this step is a coarse emulsion.
Step 4:
"Finish" the emulsification by higher energy mixing (homogenization, high shear, and the like).
Step 5:
Blend a cooked starch/water mixture with the "finished" emulsion to make a finished product.

Forms of SPE that are suitable for use as a flavor carrier, are shown in Table 1. SPE types shown are derived from cottonseed oil or soybean oil, although other sources are also suitable. Mouthcoating is correlated with the percent solids at body temperature. Therefore, a suitable source of SPE is likely to be one that has a relatively low percent solids at body temperature, e.g., CSOI is preferred to SBO III.

TABLE 1

| Temp. (°F.) | Percent Solids at Given Temperature SPE Type | | | |
|---|---|---|---|---|
| | SBO I | SBO II | CSO I | SBO III |
| 50 | 59 | 57.7 | 6.4 | 11.6 |
| 70 | 45.7 | 47.5 | 3.3 | 8.3 |
| 80 | 36.4 | 39.2 | 2.8 | 6.9 |
| 92 | 18.3 | 19.8 | 1.7 | 5.9 |
| 100 | 8.6 | 8.3 | 1.3 | 6 |
| 105 | ? | 0 | ? | ? |
| 140.3 | 0 | | ? | ? |
| 143.8 | | | ? | 0 |
| 145 | | | 0 | |

Note that zero percent solids indicates complete melt point; this is not a desirable property at body temperature because it is likely to increase anal leakage.
CSO = SPE made from fatty acids derived from cottonseed oil
SBO = SPE made from fatty acids derived from soybean oil.

EXAMPLE 5

Natural Cheese Products Produced with Polyol Polyester (PFAP) Flavored by Volatile Transfer Product Evaluation Cheese was made by standard procedures according to the following steps:

1. Add a flavored fat replacement (for example, a sucrose polyester) or fat mimetic to skim milk in a cheese vat at an approximately 2.5–3.6% level.
2. Optionally add a fraction of liquid butter oil as a flavor precursor to a level in vat milk which will yield fat in final product of less than 1.74%.
3. Add starter cultures [*Streptococcus lactis; Streptococcus cremoris; Lactobacillus helveticus; Streptococcus thermophilis*], adjunct cultures [*Diact lactis*]and any ripening enzymes [lipass, protease, and peptidase enzymes ]to the cheese milk and ripen for about 30–60 minutes at 88° F.
4. Add coagulant and suspend agitation for 30 minutes to produce a coagulum.
5. Cut coagulum into ⅜" cubes and let heal for 15 minutes.
6. Raise temperature to 102° F. over a 30 minute period.
7. Stir until curd pH reaches 6.0.
8. Drain whey from curd over a 30 minute period.
9. Salt curd with NaCl when pH of curd is above 5.6–5.8. Additional cheese ripening enzymes are optionally added at this point with the salt.
10. Press cheese under vacuum.
11. Package cheese blocks in air tight plastic bags.
12. Cure cheese blocks until flavor develops.

A panel of three expert cheese graders evaluated the resulting cheese products in a blind test. Sample #1 was Cheddar cheese prepared with control PFAP Sample #2 was Cheddar cheese prepared with PFAP and anhydrous butterfat flavored "volatiles" (SPE flavored by volatilization) Sample #3 was Cheddar cheese prepared with PFAP and Grill flavored volatiles Products were evaluated for texture (T), mouthcoating (M), and flavor (F). Samples were served refrigerated and cut into ½"×½"×1.5" sticks.

Scoring for Flavor

Flavor was defined as recognition of the presence of flavor associated with butterfat or with the "Grill" flavors introduced into the raw material SPE. If flavor was present, the score was 1; if flavor was not present the score was 0.

Scoring for Texture

Samples were ranked 1 for the least liked through 3 for the most liked.

Scoring for mouthcoating

Samples were ranked 1 for the least mouthcoating through 3 for the most mouthcoating. The results are shown in Table 2. Scores of the three graders were added.

TABLE 2

|  | T | M | F |
| --- | --- | --- | --- |
| Sample #1 | 3 | 9 | 0 |
| Sample #2 | 6 | 6 | 3 |
| Sample #3 | 9 | 3 | 3 |

Discussion

The scores for flavor indicate that the graders were able to distinguish the samples made with flavored PFAP demonstrating that the transferred flavors did carry through to the final product. The texture score indicates the most preferred texture was associated with the "Grill" flavored PFAP, followed by the anhydrous butterfat flavored PFAP. The least preferred was the untreated (unflavored) PFAP. Scores for the perception of mouthcoating indicate that the cheese made with the untreated PFAP had the most mouthcoating and the cheese made with the "Grill" flavored PFAP had the least mouthcoating.

EXAMPLE 6

Flavor/Color Concentrate for Cheese Making

For a flavor/color concentrate, 500 grams of melted, grill flavored SPE (SBO III) were mixed with 25 grams of a 30% Beta Carotene solution (Roche Vitamins & Fine Chemicals) and 1050 grams skim milk in a blender for 60 seconds. The blended material was then passed through a bench scale, two stage, standard dairy homogenizer. A 315 gram portion of the SPE flavor/color concentrate is sufficient to treat 1000 pounds of milk for making grill flavored natural Cheddar cheese with a color comparable to commercial cheddar cheese.

EXAMPLE 7

Addition of SPE "Grill Flavor Carrier" Directly to Prepared Food Condiment.

In a double boiler pan 3 grams of grill flavored SPE, prepared by method described in Example 1, were melted. The source of grill flavor transferred to the SPE was "Natural Grill Flavor®" (L2558NGF), which is a Kraft Food Ingredient (see U.S. Pat. Nos. 4,820,538 and 4,571,342). To the melted material 147 grams of prepared tomato catsup was added to form a mixture. The mixture was blended by hand for 30 seconds. The flavored catsup was then packaged and cooled to 35° F.

EXAMPLE 8.

Taste Test Condiments Flavored Using SPE to Carry "grill flavor"

Tomato catsup and mustard samples were prepared by the method described in Example 7. A mayonnaise was prepared by the same method with exception of the flavor concentration which was 1% versus 2% for the catsup and mustard.

A panel of 5 experienced tasters was asked to evaluate in a blind fashion the grill flavored condiments versus unflavored condiments on steamed hot-dogs or oven broiled hamburger patties. The panelists were asked to use any of the condiments as they would normally in preparing their sandwich. A duplicate sandwich was prepared with unflavored versions of the condiments. After tasting, the panelists were asked to evaluate the flavor in comparison to their recollection of similar foods cooked on outdoor grills. Additionally the panelists were asked to determine which sandwich had the most preferred overall flavor.

Results

Five of the five panelists were able to distinguish the grill flavor on the sandwiches. Additionally, all five panelists preferred the sandwiches prepared with grill flavored condiments over the sandwiches prepared with the standard condiments.

EXAMPLE 9

Flavored SPE for "Fat Free" Frying

Frying foods with digestible fat causes several health concerns. If animal fat such as lard is used, saturated fat and high calories plague the consumer. If low saturated fat vegetable oil is used, the concern of calories from high fat is still significant. SPE has been disclosed as a material for frying that eliminates the saturated fat and calories. Unfortunately because of the bleaching and deodorizing steps used during SPE manufacture, flavor is eliminated even if the starting fatty acids were sourced from an animal fat. Vegetable oils do not have the most desirable fried flavor and produce bland results when used for frying. The present invention overcomes some frying problems encountered with either SPE or vegetable oil. To overcome the flavor problem, a lard flavored SPE can be used for frying and is prepared, as described in Example 7-the Grill flavored material. A preferred method of producing flavored SPE frying oil is produced by diluting the concentrated "grill flavor" SPE with unflavored SPE to a final concentration of 5%.

19 ml of melted "concentrated Grill flavor" SPE was prepared by methods similar to those recited in Example 1. The resulting 19 mls combination was added to 3800 ml of melted SBO III (Table 1). The resulting mixture is suitable for use in any frying application, as illustrated in Example 10.

EXAMPLE 10

Taste Test of Using Fat Free Flavored Frying Oil

The mixture resulting from Example 9 was placed in a standard electric deep fat fryer and heated to 375° F. Frozen precut potatoes were added and cooked until golden brown. Five experienced taste panelists were asked to evaluate samples of the French fried potatoes prepared with the fat free flavored frying oil. The panelists were also provided control French fried potatoes prepared with unflavored SPE frying oil.

Results

Five of the five panelists were able to detect the added flavor in French fries fried in flavored SPE. The panelists described the flavor as "old fashioned" or reminiscent of fries cooked in animal fat. Fries made with flavored SPE were preferred to those fried in the unflavored control.

CITED DOCUMENTS

The references listed below are incorporated herein by reference to the extent that they supplement, explain, provide a background for or teach methodology, techniques or compositions described here.

Bennett, H. (1947) *Practical Emulsions*, Chemical Publishing Company, Brooklyn, N.Y.
Chapman and Sharp (1981) in Robinson, R. *The Microbiology of Milk Products* v. 2, Chap. 6 in Dairy Microbiology, Applied Science Publishers, N.J.
U.S. Pat. No. 3,164,477
U.S. Pat. No. 3,600,186
U.S. Pat. No. 4,005,195
U.S. Pat. No. 4,005,196
U.S. Pat. No. 4,191,964
U.S. Pat. No. 4,199,608
U.S. Pat. No. 4,571,342
U.S. Pat. No. 4,820,538
U.S. Pat. No. 4,830,787
U.S. Pat. No. 4,865,868
U.S. Pat. No. 4,919,964
U.S. Pat. No. 4,992,293
U.S. Pat. No. 5,073,398
U.S. Pat. No. 5,158,796

What is claimed is:

1. A flavored fat substitute comprising a fat substitute and a flavor; the flavored fat subs which is prepared by volatile transfer of the flavor into the fat substitute;
   wherein the fat substitute me is a non-digestible fat and the flavored fat substitute is essentially free of diestibe fat.
2. The flavored fat substitute of claim 1, wherein the fat substitute is a polyol polyester.
3. The flavored fat substitute of claim 2, wherein the polyol polyester is a sucrose polyester.
4. The flavored fat substitute of claim 1, wherein the flavor is a synthetic flavor.
5. The flavored fat substitute of claim 1, wherein the flavor is a grill flavor.
6. A method to add flavor to a food, comprising adding to the food a flavored fat substitute, said flavored fat substitute substitute and a flavor and which is prepared by volatile transfer of the flavor into the substitute;
   wherein the fat substitute non-digestible fat, the flavored fat substitute is essentially free of digestible fat, and the food is essentially free of digestible fat.
7. The method of claim 6, wherein the flavor is a synthetic flavor.
8. The method of claim 6, wherein the flavor is derived from a fat fraction of flavor components in a food.
9. The method of claim 6, wherein the flavor is lipophilic.
10. The method of claim 6, wherein the food is a viscous product.
11. The method of claim 10, wherein the viscous product is a sauce.
12. The method of claim 11, wherein the sauce is Hollandaise.
13. The method of claim 10, wherein the viscous product is a dressing.
14. The method of claim 6, wherein the food is a dairy product.
15. The method of claim 14, wherein the dairy product is a cultured dairy product.
16. The method of claim 15, wherein the cultured dairy product is a cheese.
17. The method of claim 16, wherein the cheese is a Cheddar cheese.
18. The method of claim 6, wherein the food is a condiment.
19. The method of claim 6, wherein the non-digestible fat is a polyol polyester.
20. The method of claim 19, wherein the polyol polyester is a sucrose polyester.
21. The method of claim 6, wherein the flavor added to the fat substitute is a volatile flavor component of a food with a desired flavor.
22. A food with a lipid phase, comprising a flavor added by the method of claim 6.
23. A composition comprising a flavored fat substitute and a food, said flavored fat substitute which comprises a fat substitute and a flavor and which is prepared by volatile transfer of the flavor into the fat substitute, and said composition which is prepared by the process comprising adding said flavored fat substitute to said food;
   wherein the fat substitute is a non-digestible fat, the flavored fat substitute is essentially free of digestible fat, and the composition is essentially free of digestible fat.
24. The composition of claim 23, wherein the flavor is a synthetic flavor.
25. The composition of claim 23, wherein the flavor is derived from a fat fraction of the flavor components of a food.
26. The composition of claim 23, wherein the flavor is lipophilic.

27. The composition of claim 23, wherein the food is a dairy product.

28. The composition of claim 27, wherein the dairy product is a cultured dairy product.

29. The composition of claim 28, wherein the cultured dairy product is a cheese.

30. The composition of claim 30, wherein the food is a viscous product.

31. The composition of claim 30, wherein the viscous product is a salad dressing.

32. The composition of claim 31, wherein the salad dressing is a mayonnaise.

33. The composition of claim 30, wherein the food is a sauce.

34. The composition of claim 33, wherein the sauce is a hollandaise sauce.

35. The composition of claim 23, wherein the food is a condiment.

36. The composition of claim 23, wherein the food is an edible oil.

37. The composition of claim 36, wherein the food is safflower oil.

38. The composition of claim 23, wherein the food is a frying oil.

39. A method for preparing a fried food wherein the food is fried in a flavored fat substitute, said flavored fat substitute which comprises a fat substitute and and which is prepared by volatile transfer of the flavor into the fat substitute;

wherein the fat substitute is a non-digestible the flavored fat substitute is essentially free of digestible fat, and the fried food is essentially free of digestible fat.

\* \* \* \* \*

UNITED STATES PATENT AND TRADEMARK OFFICE
CERTIFICATE OF CORRECTION

PATENT NO. : 5,587,196
DATED : December 24, 1996
INVENTOR(S) : Mehnert et al.

It is certified that error appears in the above-indentified patent and that said Letters Patent is hereby corrected as shown below:

Title Page, References Cited (56) 4,919,964 should read 4,191,964
Column 3, line 66: "De" should read --be--
Column 9, line 9: "Diact" should read --Diacty--
        9, line 10: "lipass" should read --lipase--
Column 11, line 66: "subs" should read --substitute--
Column 12, line 1: "me" should be deleted
        12, line 2: "diestibe" should read --digestible--
        12, line 13: after "said flavored fat substitute" insert --which comprises a fat--
        12, line 15: before "substitute" insert --fat--
        12, line 16: after "fat substitute" insert --is a --
Column 14, line 9: between the two "and's" insert --a flavor--
        14, line 11: after "non-digestible" insert --fat,--

Signed and Sealed this

Twenty-seventh Day of May, 1997

Attest:

BRUCE LEHMAN

*Attesting Officer*      Commissioner of Patents and Trademarks